(12) United States Patent
Zhou et al.

(10) Patent No.: US 12,438,340 B2
(45) Date of Patent: Oct. 7, 2025

(54) ULTRA SMALL PACKAGED TUNABLE LASER ASSEMBLY

(71) Applicants: Zhigang Zhou, San Jose, CA (US); Kevin Boyd, San Jose, CA (US); Guang-Hua Duan, San Jose, CA (US); Min Huang, San Jose, CA (US); Zhenming Xie, San Jose, CA (US); Rihao Li, San Jose, CA (US); Qiang Liu, San Jose, CA (US); Huixian Wen, San Jose, CA (US); Jianguo Wang, San Jose, CA (US)

(72) Inventors: Zhigang Zhou, San Jose, CA (US); Kevin Boyd, San Jose, CA (US); Guang-Hua Duan, San Jose, CA (US); Min Huang, San Jose, CA (US); Zhenming Xie, San Jose, CA (US); Rihao Li, San Jose, CA (US); Qiang Liu, San Jose, CA (US); Huixian Wen, San Jose, CA (US); Jianguo Wang, San Jose, CA (US)

(73) Assignee: O-Net Communications, Inc., San Jose, CA (US)

( * ) Notice: Subject to any disclaimer, the term of this patent is extended or adjusted under 35 U.S.C. 154(b) by 526 days.

(21) Appl. No.: 17/987,821

(22) Filed: Nov. 15, 2022

(65) Prior Publication Data
US 2024/0162682 A1 May 16, 2024

(51) Int. Cl.
H01S 5/14 (2006.01)
H01S 5/06 (2006.01)
H01S 5/0683 (2006.01)

(52) U.S. Cl.
CPC .......... *H01S 5/141* (2013.01); *H01S 5/0612* (2013.01); *H01S 5/06837* (2013.01); *H01S 2301/03* (2013.01)

(58) Field of Classification Search
CPC ........ H01S 5/14; H01S 5/141; H01S 5/06837
See application file for complete search history.

(56) References Cited

U.S. PATENT DOCUMENTS

| 12,100,933 | B2* | 9/2024 | Luo | H01S 5/141 |
|---|---|---|---|---|
| 2001/0024462 | A1* | 9/2001 | Nakahara | H01S 5/0687 |
| | | | | 372/43.01 |
| 2003/0016709 | A1* | 1/2003 | Flanders | H01S 5/141 |
| | | | | 372/98 |
| 2006/0251425 | A1* | 11/2006 | Kupershmidt | G02B 6/022 |
| | | | | 398/147 |
| 2007/0002927 | A1* | 1/2007 | Finot | H01S 5/02438 |
| | | | | 372/99 |

(Continued)

*Primary Examiner* — James A Menefee
(74) *Attorney, Agent, or Firm* — PatentPC PowerPatent (57) ABSTRACT

An external cavity tunable laser includes a gain medium module to generate a broadband optical spectrum covering a predetermined wavelength range; a collimate lens turning a diverging beam into a collimated beam; a pair of etalons to tune frequency; an actuator to adjust an external cavity optical pathlength; a bandpass filter to block one or more frequencies outside the predetermined wavelength range; a beam splitter to split a percentage of the beam to a photodetector; a reflection mirror for feedback to gain medium waveguide; an isolator for preventing reflecting light back to the external cavity; and a hermetically sealed housing less than 0.15 cubic centimeters.

17 Claims, 6 Drawing Sheets

(56) References Cited

U.S. PATENT DOCUMENTS

| | | | |
|---|---|---|---|
| 2007/0230866 A1* | 10/2007 | Daiber | G02B 6/29394 385/24 |
| 2013/0177034 A1* | 7/2013 | Liu | H01S 3/10 372/20 |
| 2013/0243020 A1* | 9/2013 | Kim | H01S 5/02375 372/44.01 |
| 2014/0321488 A1* | 10/2014 | Chen | H01S 5/02461 438/694 |
| 2020/0280170 A1* | 9/2020 | Tu | H01S 5/0687 |
| 2021/0036489 A1* | 2/2021 | Tu | H01S 5/02251 |

\* cited by examiner

ULTRA SMALL PACKAGED TUNABLE LASER ASSEMBLY

FIELD OF THE INVENTION

The present application is directed to a tunable laser and, more particularly, to a small, packaged tunable laser assembly.

BACKGROUND

Optical transmission systems are used to transmit data and/or audio communications in enterprise and telecommunication networks. Optical signals offer superior signal quality and speed, as well as minimal interference from external electro-magnetic energies. Multi-channel optical links are possible with optical networks that use Dense Wavelength Division Multiplexed systems (DWDM).

Lasers are a common light source in optical networks. An external cavity tunable laser is typically used where an optical signal may be modulated by a data signal to modulate the optical output of a light source and then sent onto an optical network.

Because of wavelength and optical power tunability and narrow linewidth, tunable lasers have wide applications, not only in telecom but also in datacom. To be adapted in various applications, ultra-small form factor packaged tunable lasers are needed, such as, QSFP DD, nano-ITLA (Integrated Tunable Laser Assembly), and pico-ITLA. The challenges to be ultra-small form factors are obvious while performance is not compromised at all. Higher performance is demanded with time and with reduction of package form factors.

SUMMARY

In one aspect, an external cavity tunable laser includes a gain medium module to generate a broadband optical spectrum covering a predetermined wavelength range; a collimate lens turning a diverging beam into a collimated beam; a pair of etalons to tune frequency; an actuator to adjust an external cavity optical pathlength; a bandpass filter to block one or more frequencies outside the predetermined wavelength range; a beam splitter to split a percentage of the beam to a photodetector; a reflection mirror for feedback to gain medium waveguide; an isolator for preventing reflecting light back to the external cavity; and a hermetically sealed housing less than 0.15 cubic centimeters.

In another aspect, A method of communicating with light includes providing an external cavity tunable laser with a hermetically sealed volume of about 0.15 cubic centimeters; using a gain medium module to generate a broadband optical spectrum covering a predetermined wavelength range; turning a diverging beam into a collimated beam with a collimate lens; tuning a frequency with a pair of etalons; adjusting an external cavity optical pathlength; performing bandpass filtering to block one or more frequencies outside the predetermined wavelength range; splitting a percentage of the beam to a photodetector; providing a reflection mirror for feedback to gain medium waveguide; and preventing reflecting light back to the external cavity with an isolator.

In another aspect, an external cavity tunable laser is configured in an ultra-small form factor hermetic package which size is less than 0.15 cubic centimeters. The tunable laser contains a gain medium for generating a broadband optical spectrum covering a designated wavelength range, a collimate lens turning a diverging beam into a collimated beam, a pair of etalons for tuning frequency using Vernier mechanism, an actuator for adjusting external cavity optical pathlength, a bandpass filter to block any frequencies outside the designated wavelength range, a beam splitter to split a small percentage of the beam off to a photodetector, a reflection mirror for feedback to gain medium waveguide, and an isolator for preventing reflecting light back to the external cavity. In addition, an optical output subassembly is attached to the housing.

Implementations of the above aspects can include one or more of the following. The integrated etalons and phase tuner with heaters, respectively, are used with ultra-small tunable laser package. A heater can be directly deposited on top of the gain medium waveguide for suppression of stimulated Brillouin scattering, especially when the gain medium at a high bias current. A heater can be embedded on a submount with the gain medium flip-chip mounted meaning the gain medium waveguide in contact with the heater. Therefore, the gain medium chip is mounted with p-down. Heating the heater in a periodic waveform, sign wave or triangle wave, we may suppress stimulated Brillouin scattering effect. This signal can also be used for wavelength locking. Due to ultra-small form factor, thermal isolation for each etalon and a phase tuner is difficult. One implementation can provide accurate temperature controls with thermal cross-talk.

Advantages of the system may include one or more of the following. The assembly provides a compact, high-performance tunable Integrated Laser Assembly that can dramatically lower the barriers to deployment and operation of high capacity, dense-wavelength division-multiplexing (DWDM) networks. The combined Laser Source and modulator reduces the high cost of individual components. The integration of source/modulator into one hermetic package increases reliability.

DETAILED DESCRIPTION

Figure 1:
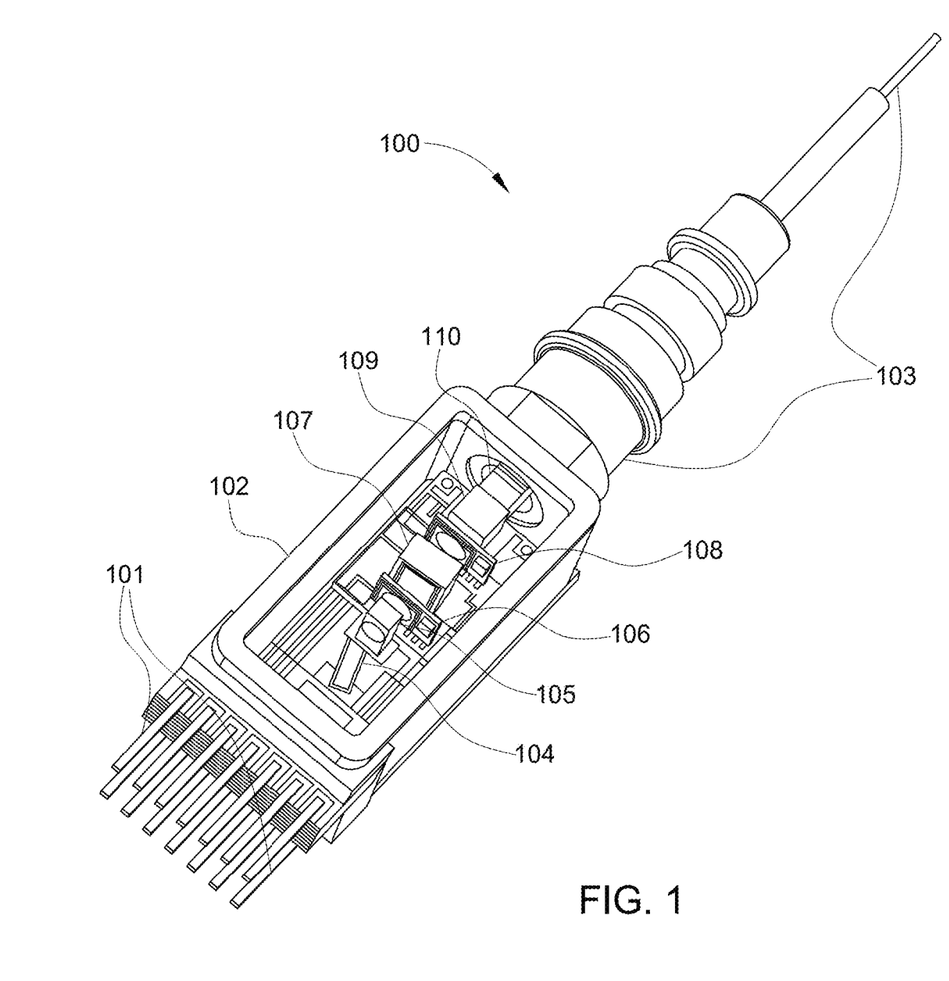
FIG. 1 shows an exemplary top perspective view of ultra-small tunable laser package.

This application is directed to an ultra-small form factor tunable laser package as seen in FIG. 1. The ultra-small form factor package 100 (FIG. 1) or 200 (FIG. 2) enables wide applications such as in nano-ITLA and pluggable optical transceiver, such as, 400G ZR QSFP DD. Housing 102 which is less than 0.15 cubic centimeter containing the external cavity tunable laser. In one specific embodiment, the package length is 8.5 mm, width is 4.2 mm, and height is 4 mm. The volume is 0.146 cubic centimeters. The housing may be hermetically sealed against humidity and other atmospheric gas conditions.

The electrical interface 101 or 201 is configured on one end of the housing, either on the side in a single row, or on the end in double rows. The electrical interface 101 is to receive electrical power and receive/output control information containing signals.

Figure 2:
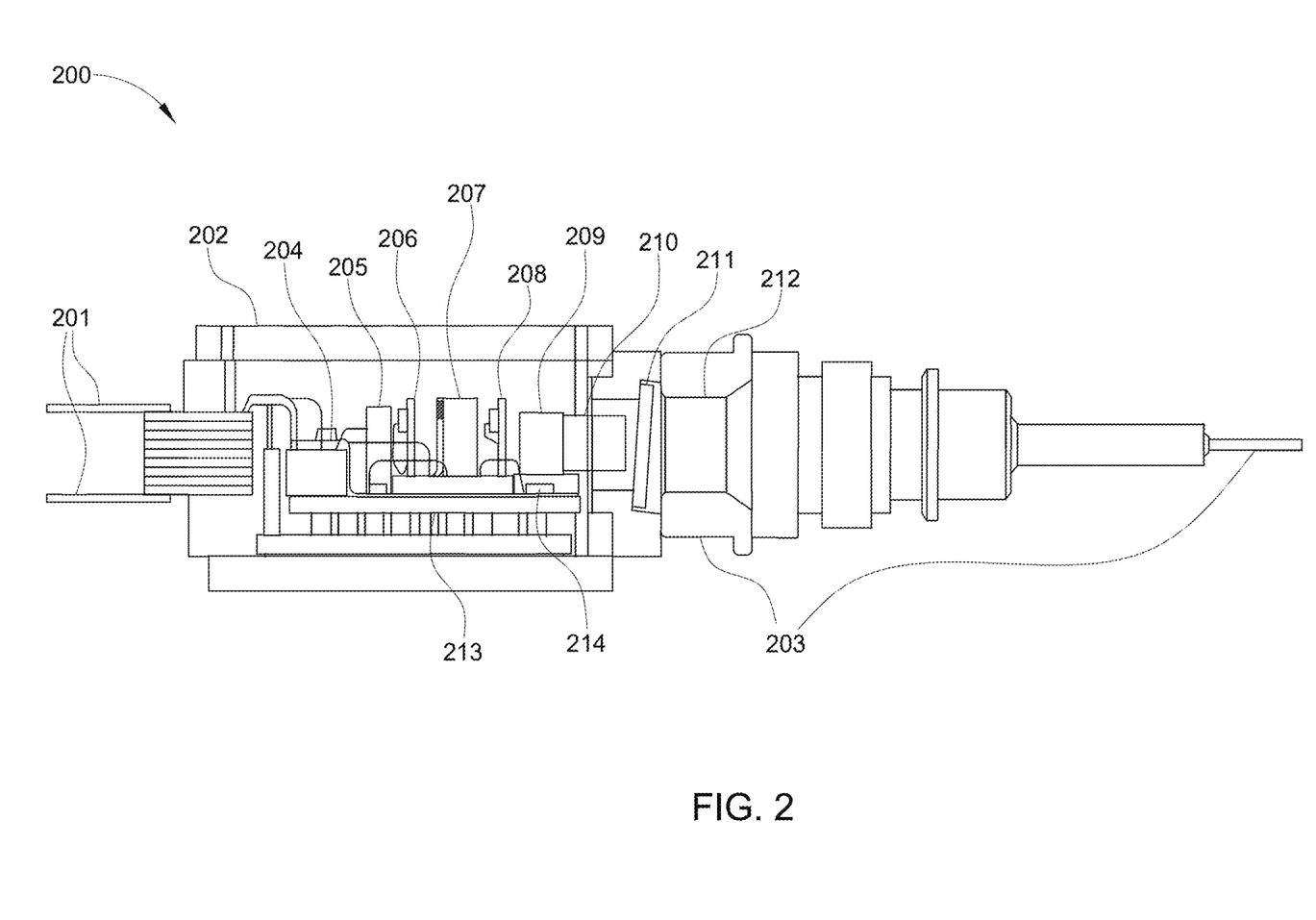
FIG. 2 shows an exemplary a cross section view of ultra-small tunable laser package.

The external cavity laser includes all the components inside the housing 102 or 202, such as, 104-110, as shown in FIGS. 1 and 214 in FIG. 2. An optical interface attached to the housing, such as, 103, is shown in FIG. 1 or 203 of FIG. 2.

The external cavity tunable laser includes a diode gain chip 104 and a collimate lens 105 in the beam path emitted from the gain chip 104 in FIG. 1 or 204 in FIG. 2. Collimate lens 105 in FIG. 1 or 205 in FIG. 2 is mounted on the TEC platform 213 as shown in FIG. 2. Gain chip 104 in FIG. 1 or 204 in FIG. 2 is mounted on substrate 502. Gain chip on submount (CoS) 500 is mounted on TEC platform 213 as shown in FIG. 2.

The external cavity tunable laser further includes a tuner subassembly which includes the first etalon 106 and the second etalon 108 and the phase tuner 107. The first and the second etalons, 106 and 108, may be made of the same or different materials. Their thickness may be the same or different. Refractive indices and thickness of one or both etalons, 106 and 108, may be tuned by temperature induced by heater 301. A vernier tuning mechanism is utilized for selecting wavelengths. The phase tuner 107 tunes external cavity optical pathlength for fine tuning wavelength and locking the wavelength with the dither signal applied onto gain chip heater 503. A band pass filter is applied onto the phase tuner 107. A beam splitter 109, is positioned downstream of the tuner subassembly which comprises components 106, 107, and 108. One beam moves along the optical axis to isolator 110 which prevents reflections from optical output interface. After the beam goes through the isolator 110 (FIG. 1), it passes through the package window 211 (FIG. 2). Then the beam is coupled to fiber assemblage 103 (FIG. 1) via a lens 212 (FIG. 2) The other beam from the beam splitter 109 (FIG. 1) or 209 (FIG. 2) reaches to monitor photo diode (MPD) 214 in FIG. 2. The output signal from MPD 214 may be used for optical power monitoring and wavelength locking.

Figure 3:
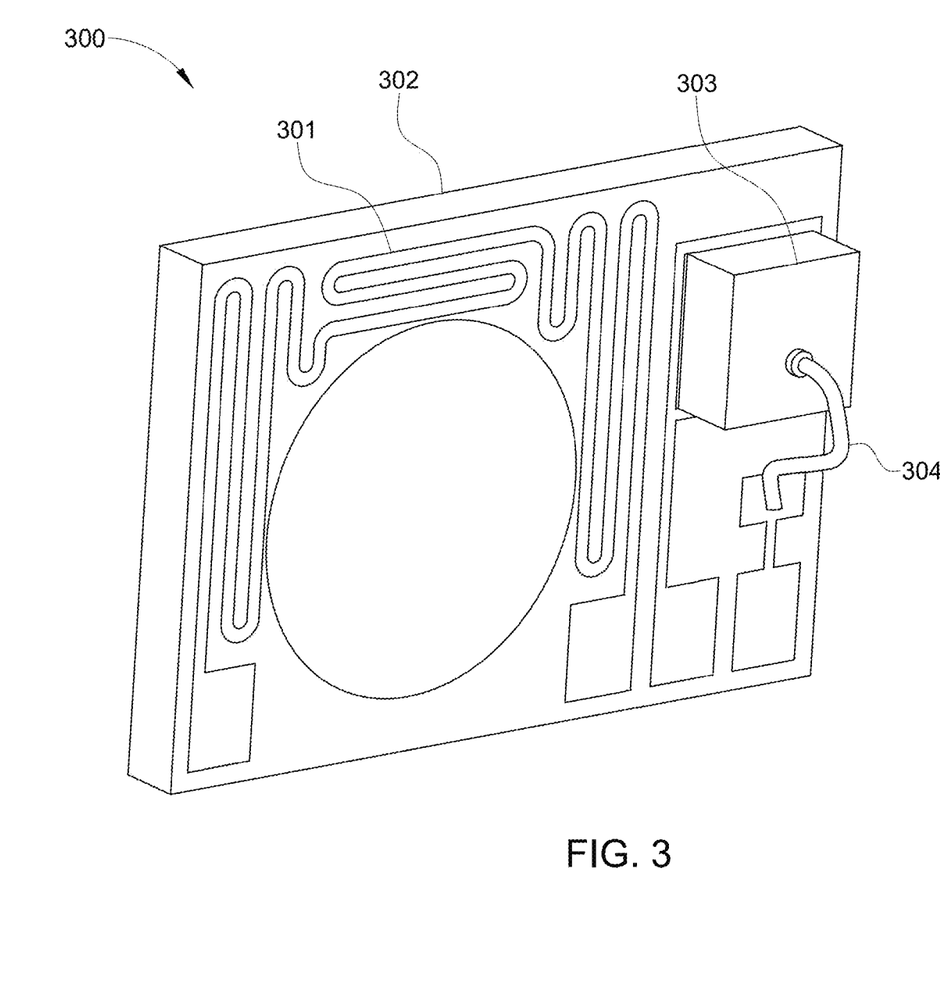
FIG. 3 shows an exemplary top perspective view of partially integrated etalon.

The temperature on etalon 106 or 108 induced by heater 301 which can be integrated for both etalons as seen in FIG. 3. Etalon 302 is prepared with both surfaces parallel to each other before heater element 301 is deposited by a thin film physical deposition technique. A thermistor 303 is attached onto partially integrated etalon 300 by eutectic soldering or epoxy adhesion. Thin gold wire 304, for example, with diameter 15-35 microns, is bonded onto thermistor 303 and the metalized conductive pad on the etalon 302.

Figure 4:
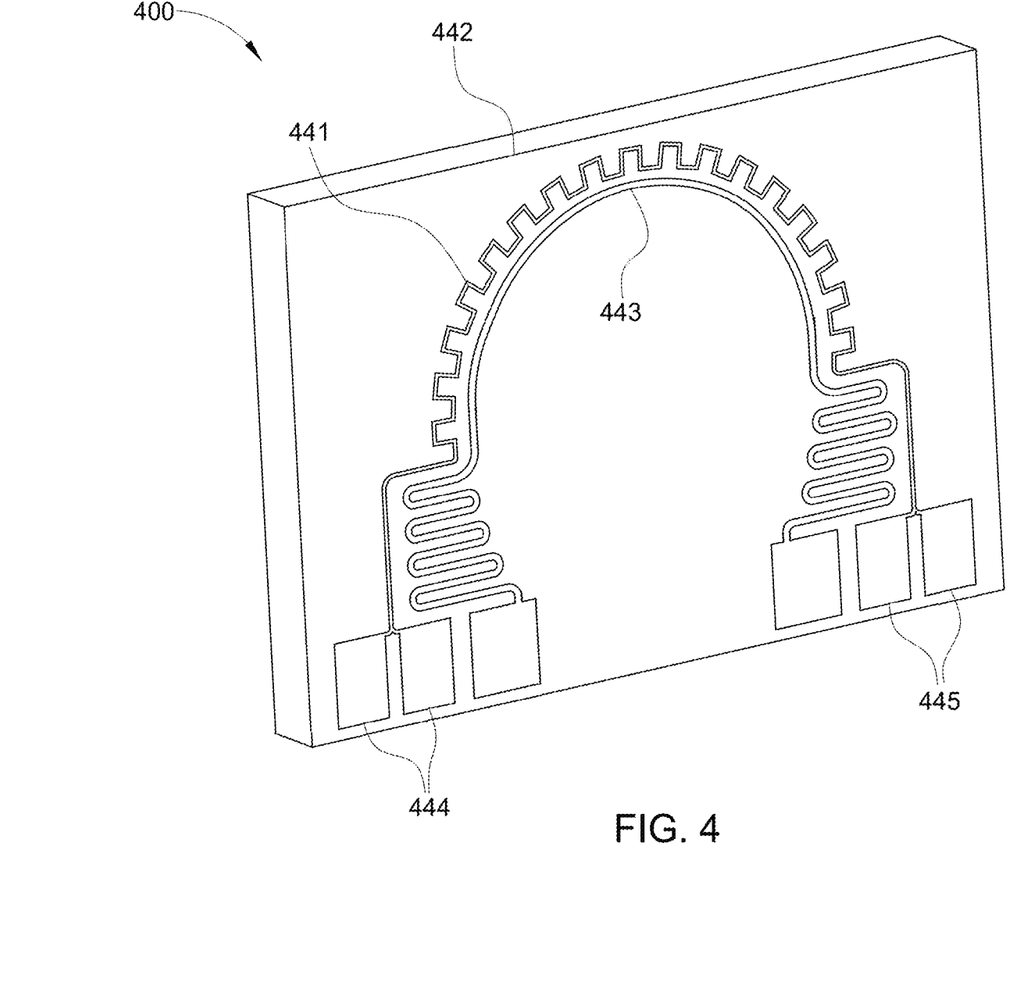
FIG. 4 shows an exemplary top perspective view of a fully integrated etalon.

An etalon 400 with substrate 442 may be further integrated with a thin film heater 441 and a thin film resistive temperature device (RTD) 443 as shown in FIG. 4. RTD's electrical resistance is about 2 orders smaller than a thermistor which is usually about 10K ohms at room temperature. Besides, RTD's resistance temperature coefficient is relatively small compared with thermistor's resistance temperature coefficient. Therefore, contact resistance can't be neglected in the case of fully integrated etalon 400. To cancel out the contact resistance, the fully integrated etalon 400 uses or two pairs of pads, 444 and 445, for electrical contacts.

Figure 5:
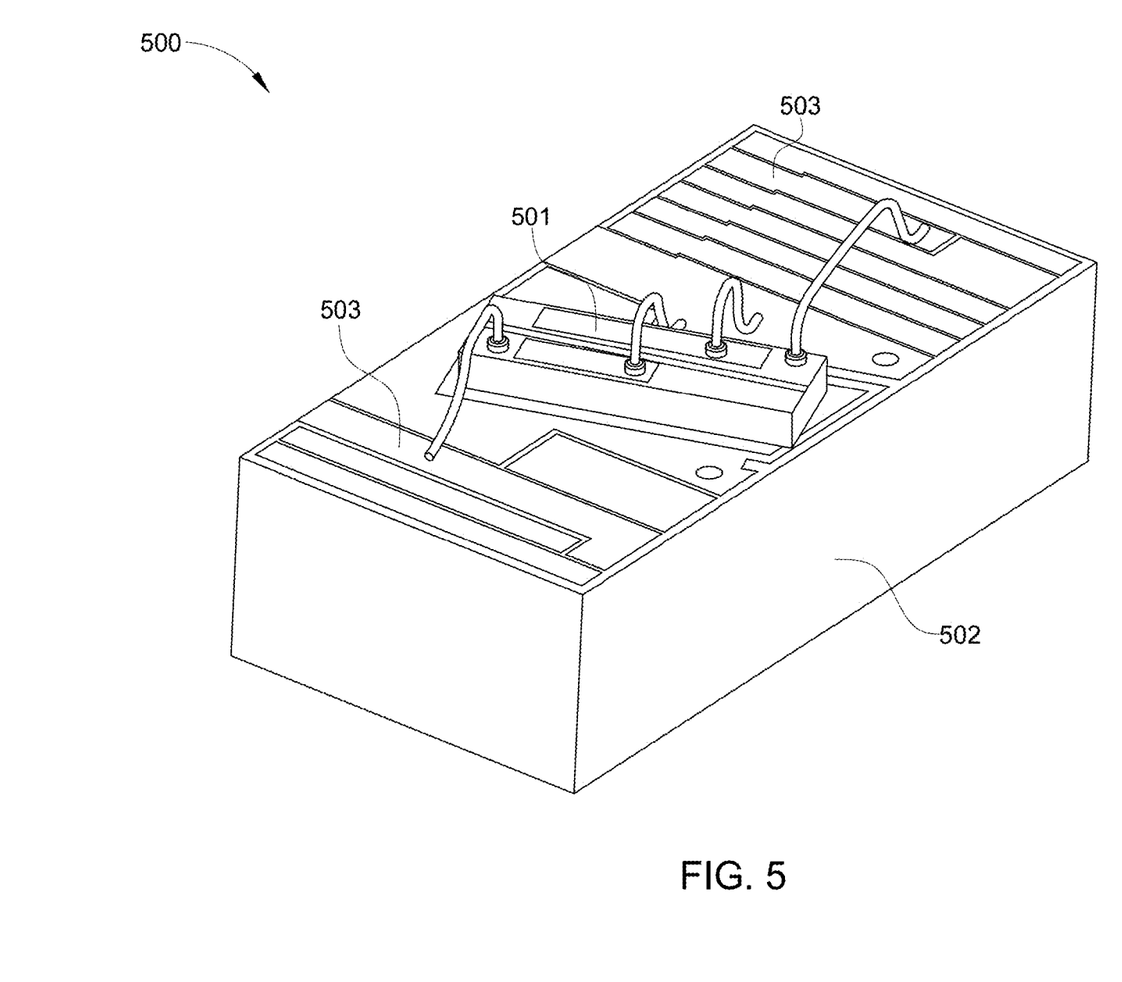
FIG. 5 shows an exemplary top perspective view of a gain chip on submount with P-side up.

The chip on submount (CoS) 500 is illustrated in FIG. 5. The gain chip 501 is mounted on submount 502 with P-side up. On top of the gain chip waveguide, there is a thin layer of resistive heater with resistance 50-500 ohms. The heater is connected to the metallized pads 503 for electrical connections. A dither signal with a sine wave or a triangle wave is applied to the heater via the electrical connections for wavelength locking.

Preferably, the tunable laser module is temperature stable to minimize drifts in the cavity optical pathlength and/or to stabilize the phase of the laser cavity. Temperature control also allows fine tuning for frequency accuracy. In one embodiment, a lookup table can be made before the laser operation, in which each channel of the ITU grating is associated with both the injection currents of the laser diode and the heater, i.e. the temperature T of the gain medium. The slight change in T is due to a small change in the phase of the laser cavity that can be adjusted for fine tuning of the wavelength of the cavity mode using the selected wavelength peak of the Fabry Perot etalon.

Figure 6:
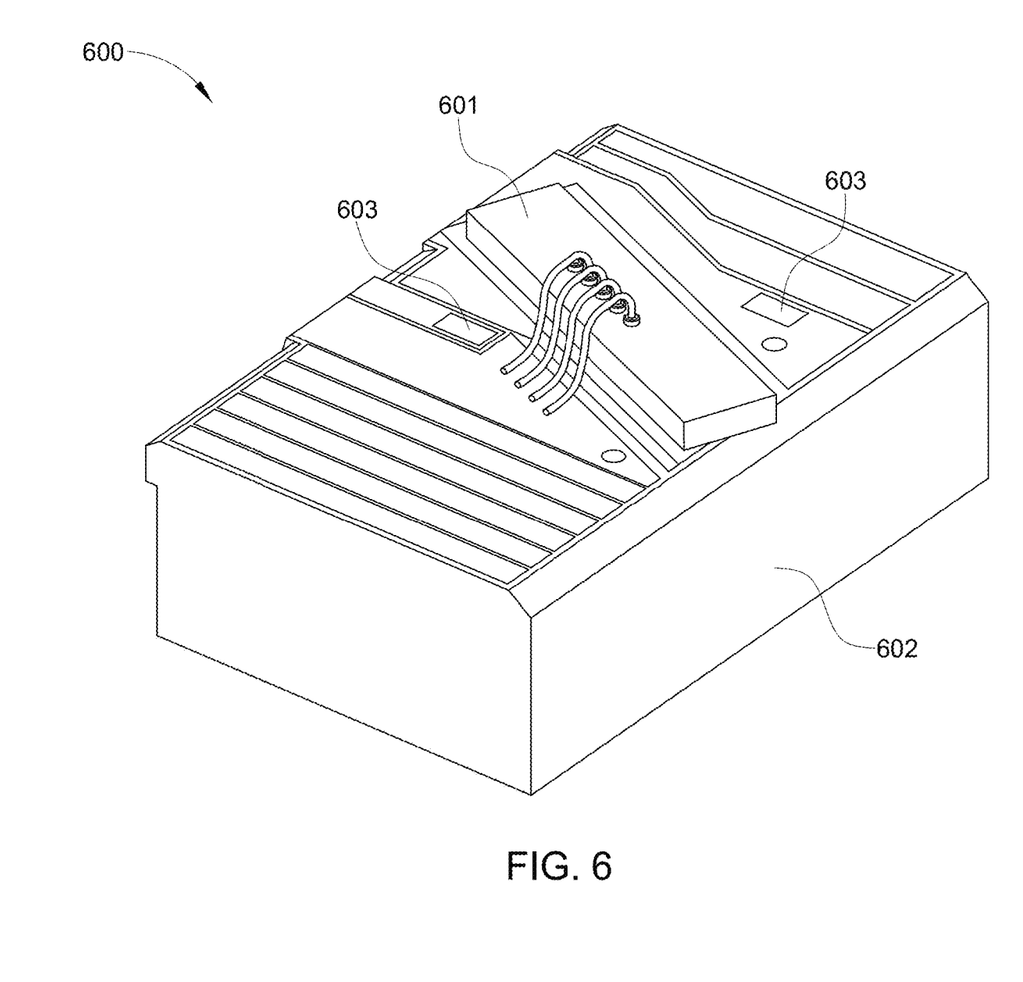
FIG. 6 shows an exemplary top perspective view of a gain on submount with P-side down.

The chip on submount (CoS) 600 is illustrated in FIG. 6. The gain chip 601 is flip chip mounted on the submount 602 with P-side down. On top of submount 602 and beneath gain chip waveguide, there is a thin layer of resistive heater with resistance 50-500 ohms. The heater is connected to the metallized pads 603 for electrical connections. A dither signal with a sine wave or a triangle wave is applied to the heater via the electrical connections for wavelength locking.

The resulting external cavity tunable laser configured in ultra-small form factor hermetic package 100 which housing volume is less than 0.15 cubic centimeters. The tunable laser 100 contains a gain medium for generating a broadband optical spectrum covering a designated wavelength range, such as, C-band or L-band, collimate lens, 105 or 205, turning a diverging beam into a collimated beam, a pair of etalons, 106 and 108, or 206 and 208, for tuning frequency using Vernier mechanism, an actuator or phase tuner, 107 or 207, for adjusting external cavity optical pathlength, a bandpass filter to block any frequencies outside the designated wavelength range, a beam splitter to split a small percentage of the beam off to a photodetector, a reflection mirror for feedback to gain medium waveguide, and an isolator, 110 or 210, for preventing reflecting light back to the external cavity. In addition, optical output subassembly 103 is attached to the housing coupling light into optical fiber which may be a polarization maintained fiber or a single mode fiber.

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed descriptions. The terms used in the following claims should not be construed to limit the invention to the specific embodiments disclosed in the specification. Rather, the following claims are to be construed in accordance with established doctrines of claim interpretation.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

What is claimed is:

1. An external cavity tunable laser, comprising:
a gain medium module to generate a broadband optical spectrum covering a predetermined wavelength range, the gain medium module comprising a gain medium chip with a gain medium waveguide;
one or more heaters with one heater proximal the gain medium waveguide;
electrical connections to apply a dither signal to the heater for wavelength locking;
a collimating lens turning a diverging beam into a collimated beam;
a pair of etalons to tune frequency;
an actuator to adjust an external cavity optical path length;
a bandpass filter to block one or more frequencies outside the predetermined wavelength range;
a beam splitter to split a percentage of the collimated beam to a photodetector;
a reflection mirror for feedback to the gain medium waveguide;
an isolator for preventing reflecting light back to the external cavity; and
a hermetically sealed housing less than 0.15 cubic centimeters.

2. The laser of claim 1, wherein at least one of the etalons tunes frequency using a Vernier method.

3. The laser of claim 1, wherein the one of the heaters operates when the gain medium at a high bias current.

4. The laser of claim 1, wherein at least one of the heaters is embedded on a submount with the gain medium mounted meaning the gain medium waveguide is in contact with the heater.

5. The laser of claim 1, comprising an optical output subassembly coupled to the hermetically sealed housing.

6. The laser of claim 1, wherein the one or more heaters is heated in a periodic format.

7. The laser of claim 6, wherein the periodic format comprises a sine wave format or a triangle wave format.

8. The laser of claim 6, wherein the one or more heaters suppress stimulated Brillouin scattering effect.

9. The laser of claim 1, wherein the gain medium module is mounted with p-down.

10. The laser of claim 1, wherein the housing comprises a length of about 8.5 mm, a width of about 4.2 mm, and a height of about 4 mm.

11. The laser of claim 1, wherein the housing comprises a volume of about 0.146 cubic centimeters.

12. A method of communicating with light, comprising:
providing an external cavity tunable laser with a hermetically sealed volume of about 0.15 cubic centimeters;
using a gain medium module to generate a broadband optical spectrum covering a predetermined wavelength range, the gain medium module comprising a gain medium waveguide;
turning a diverging beam into a collimated beam with a collimating lens;
tuning a frequency with a pair of etalons and dithering with one or more heaters deposited on top of the gain medium waveguide for wavelength locking;
providing a reflection mirror for feedback to gain medium waveguide; and
preventing reflecting light back to the external cavity.

13. The method of claim 12, comprising tuning the frequency using a Vernier method.

14. The method of claim 12, comprising heating the one or more etalons and actuator.

15. The method of claim 12, comprising coupling at least one heater to directly deposited on top of the gain medium waveguide for suppression of stimulated Brillouin scattering.

16. The method of claim 12, comprising operating the gain medium at a high bias current.

17. The method of claim 12, comprising placing the gain medium waveguide is in contact with the heater.

* * * * *